S. G. RANDALL.
Car-Couplings.

No. 146,709. Patented Jan. 20, 1874.

Witnesses. Inventor.
Phil. F. Lapnier. Silas G. Randall.
G. F. Stonz. By McLeod
Attorney.

UNITED STATES PATENT OFFICE.

SILAS G. RANDALL, OF PROVIDENCE, RHODE ISLAND.

IMPROVEMENT IN CAR-COUPLINGS.

Specification forming part of Letters Patent No. 146,709, dated January 20, 1874; application filed March 21, 1873.

*To all whom it may concern:*

Be it known that I, SILAS G. RANDALL, of the city and county of Providence, in the State of Rhode Island, have invented certain new and useful Improvements in Car-Couplings.

My invention relates particularly to the class of apparatus known as "automatic couplers," and has for its special object the adaptation of practicable automatic coupling mechanism to such draw-heads of usual or ordinary construction as are already in general use, although applicable partially to couplings in which the coupling-pin is not automatically controlled. My invention consists mainly in a novel link-holder, so constructed and combined with the link that the two will be practically connected, and yet be changeable from one draw-head to another, and, when in position, will at all times present the link horizontally, and in a central position within and projecting from the draw-head. It also consists in a spring-plate of novel construction which, without special fitting and placed within an ordinary draw-head, will guard the coupling-pin and prevent its falling except on the reception of the coupling-link; and I do hereby declare that the following specification, taken in connection with the drawings furnished and forming a part of the same, is a clear and true description of a car-coupling and its several parts embodying my invention.

Figure 1:
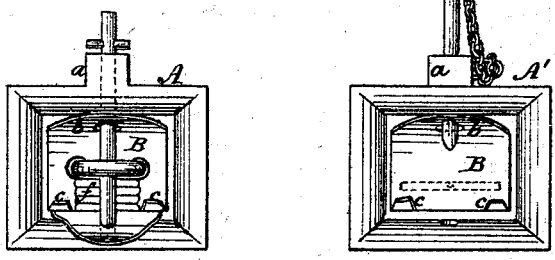
Figure 2:
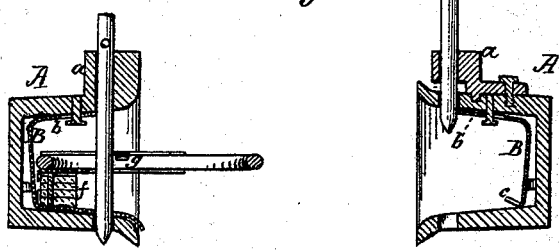
Figure 3:
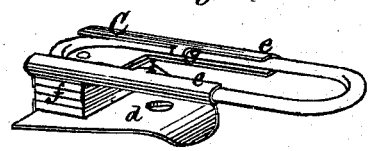
Figure 4:
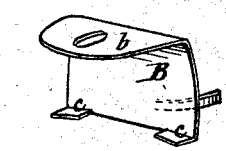
Figure 5:
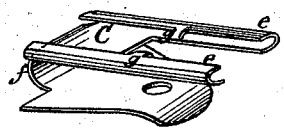

Referring to the drawings, Figure 1 represents in front view two separate draw-heads with my improvements attached. Fig. 2 represents the same in longitudinal vertical section. Fig. 3 represents the link-holder and coupling-pin detached. Fig. 4 represents in perspective one of the spring-plates detached from the draw-head. Fig. 5 represents another form of link-holder constructed of one piece of metal.

A and A' denote the draw-heads. They are shown as if wholly detached from the car, and are without any of the appliances by which they are to be connected to the truck. The first thing to be done in fitting an old-style draw-head for receiving my improvement is to secure the block *a* by its rivets or bolts to the outside of the top of the head. This block has a hole through it, coincident, and corresponding with the coupling-pin hole on the head, and by its presence affords sufficient bearing for the pin, to enable it to maintain a nearly vertical position when it is so elevated as to be entirely clear of the link-chamber. Were it not for this block, or its equivalent, it would be impossible to hold the pin sufficiently vertical to result in its being promptly dropped automatically at the proper moment. The pin-block may be constructed of cast-iron in the form of a bracket, as shown on one of the draw-heads, and provided with a base having a good general bearing, a dowel-pin for entering a hole drilled therefor in the head, and a bolt-hole for securing it to the top of the draw-head. To one side of the block *a* a pin-chain is attached, preferably of such a length as will effectually prevent the pin from being wholly removed from the hole. B denotes the spring-plate which guards the link. It is composed of spring-metal, and has an area which admits of its ready and complete reception into the interior of the draw-head. To the back of the plate a simple bow-spring is riveted, and so located as to serve as a general bearing for the plate. The upper end of the plate is provided with an arm, *b*, bent at right angles toward the front, which is so arranged that when the plate is in proper position the end of the arm will be partially across the coupling-pin hole in the draw-head. If the holes and pins be of proper proportionate size the arm of the plate need not extend more than, say, one-quarter of an inch past the circumference, as that will be ample to prevent the pin from falling. The lower edge of the plate at each corner is also turned to the front, and bent slightly upward to form the heels *c*. By giving the plate a general bearing at its edges with the four interior sides of the draw-head no special guides are required, as is usually the case with reciprocating spring-pin controlling devices as heretofore constructed. The arm *b* is slotted, and for a guide embraces the neck of a recessed head or nut in the bolt which secures the pin-block to the draw-head. C denotes a link-holder for carrying the link, and presenting it properly for coupling. The base *d* of the link-holder has an aperture through which, when in position, the coupling-pin passes. The base *d* is connected to the fingers *e* of the link-holder by a spring-standard, *f*.

The fingers e may be variously constructed to loosely embrace the link on its two outer sides, in such a manner that it may move freely longitudinally therein. The fingers are generally to be composed of sheet metal, bent so as to form one-half, or a little less, of a tube having a diameter a little greater than the iron of which the link is made. The link is prevented from leaving the fingers by means of studs g, which are capable of being readily bent up, or so arranged as to admit of the withdrawal of the link when necessary. The spring-standard f may be built up of rubber, solid or in layers, and connected with the fingers and base by a bolt or rivet. The entire link-holder may, however, be composed of one piece of thin sheet metal, having sufficient strength and possessing sufficient elasticity, as illustrated in Fig. 5. The base and the fingers may, however, be made separately, as with the rubber standard, and, instead of the latter, a U-shaped piece of flat spring metal may be riveted to the finger-plate; but little spring function is required, as the free end of the coupling-link will seldom be vertically vibrated more than, say, two or three inches, and it is necessary to provide for the ready entrance of the link into draw-heads on cars slightly higher or lower than the one in which the link is already held. The base of the link-holder is fitted at its rear end to pass under the heels c on the spring-plate, and, by contact therewith, it is securely maintained in position. From the fact that the base of the link-holder is prevented from movement by the passage through it of the link-pin, the holder will ordinarily serve to maintain the link horizontally without the assistance of the heels on the spring-plate; and it is for this reason that this portion of my invention has a special value outside of the automatic link-pin-controlling mechanism, and by its use alone the frequent accidents in coupling may be practically avoided.

Ordinary draw-heads will be fitted for my coupling as follows: No new coupling pins or links will be required if they be of the average length and otherwise suitable for ordinary usage. The pin-block is to be attached by a or rivet to the draw-head, and the pin-chain bolt applied to prevent the dislodgment of the pin. The spring-plate is inserted into the draw-head and adjusted to proper relation with the pin-hole by bending the spring so that it will have the required sweep. The slotted arm of the plate will be arranged to embrace the pin-block bolt, which, so far as the arm is concerned, serves as a mere guide-stud. A simple large-headed screw entering the end of the pin-block bolt may be readily applied for a guide-stud. The link alone, or with a holder substantially as described, if advanced into a draw-head while the pin is withheld by the spring-plate, will, by its contact with the plate, effect the release of the pin, which will fall into proper position and retain the link. If the spring be located near the center of the plate, and the plate be fitted evenly but not too closely to the draw-head, the proper operation will be effected by contact of the link with the plate at any accessible point. The bottom edge of the plate may be so cut as to extend an inclined surface toward the front of the draw-head, up which the link, if too much depressed, will be directed to a point on the plate sufficiently central to secure its proper movement. But one link-holder is required to a car, and it can readily be removed with the link and applied to any draw-head. The presence of the holder on the link does not in any manner prevent the link from operating precisely as it would without it, and the presence of the spring-plate does not prevent the use of a link without a holder.

It will be obvious that my improvements involve no radical change in the draw-heads, and do not weaken or render them unfit for use, as formerly, with the simple link.

I am aware that numerous devices have heretofore been proposed and employed in automatically dropping the coupling-pin and for maintaining the link in a proper position to enter the draw-head with which connection is to be made; but prior to my invention I know of no device which, like my spring-plate, would be adapted for use in an ordinary draw-head, nor any link-holder detachable from the draw head and combined with the link.

Having thus described my invention, I claim as new and desire to secure by Letters Patent—

1. A coupling-link, in combination with the link-holder C attached to the link, substantially as described.

2. The combination of the detachable link-holder C and link with the link-pin and its automatic supporting and releasing device B, substantially as described.

3. The spring-plate B, fitted to the interior of a draw-head and combined with an actuating-spring, and having an arm, b, for guarding the link-pin hole in the draw-head, and constructed to operate as and for the purposes specified.

SILAS G. RANDALL.

Witnesses:
JOHN W. MARTIN,
CHAS. E. PINNEY.